United States Patent [19]

Shishido et al.

[11] Patent Number: 4,929,479
[45] Date of Patent: May 29, 1990

[54] MEDICAL BAG

[75] Inventors: Kihachi Shishido; Masami Matsuoka, both of Yokohama; Noriyuki Ishihara, Amagasaki; Masahiro Tamura, Kyoto, all of Japan

[73] Assignees: Showa Denko Kabushiki Kaisha, Tokyo; Fuso Pharmaceutical Industries, Ltd., Osaka, both of Japan

[21] Appl. No.: 198,252

[22] Filed: May 24, 1988

Related U.S. Application Data

[63] Continuation of Ser. No. 82,915, Aug. 10, 1987, abandoned, which is a continuation of Ser. No. 535,117, Sep. 23, 1983, abandoned.

[51] Int. Cl.$^5$ .................... B65D 30/26; B65D 85/00; B32B 27/08; B32B 27/32
[52] U.S. Cl. .................... 428/35.2; 428/215; 428/516; 428/518; 428/520; 604/408
[58] Field of Search .................... 428/35.2, 35.4, 35.9, 428/215, 515, 516, 517, 518, 349, 520, 213, 214; 604/408

[56] References Cited

U.S. PATENT DOCUMENTS

| | | | |
|---|---|---|---|
| 4,064,296 | 12/1977 | Borstein et al. | 428/520 |
| 4,147,827 | 4/1979 | Breidt, Jr. et al. | 428/347 |
| 4,160,053 | 7/1979 | Clayton | 428/35 |
| 4,362,089 | 12/1982 | Melocik et al. | 96/461 |
| 4,364,981 | 12/1982 | Horner et al. | 428/35 |
| 4,399,173 | 8/1983 | Anthony et al. | 428/35 |
| 4,399,180 | 8/1983 | Briggs et al. | 428/212 |
| 4,418,114 | 12/1983 | Briggs et al. | 428/518 |
| 4,464,426 | 8/1984 | Anthony | 428/516 |
| 4,524,099 | 6/1985 | Di Luccio | 428/516 |
| 4,657,811 | 4/1987 | Boyd et al. | 428/516 |

FOREIGN PATENT DOCUMENTS

| | | | |
|---|---|---|---|
| 0009376 | 4/1980 | European Pat. Off. | |
| 112983 | 9/1978 | Japan | 428/518 |
| 59-97670 | 6/1984 | Japan. | |
| 1368634 | 10/1974 | United Kingdom. | |
| 2023497 | 1/1980 | United Kingdom. | |
| 1576701 | 10/1980 | United Kingdom. | |

*Primary Examiner*—George F. Lesmes
*Assistant Examiner*—Elizabeth M. Cole
*Attorney, Agent, or Firm*—Sughrue, Mion, Zinn, Macpeak & Seas

[57] ABSTRACT

A medical bag composed of a laminate comprising (i) an inner low-density polyethylene layer, (ii) an intermediate layer of ethylene-vinyl acetate copolymer, ethylene-propylene type elastomer, or ethylene-butene-1 type elasomer, and (iii) an outer low-density polyethylene layer. This bag has excellent sanitariness, flexibility, transparency, and heat-resistance, therefore, is suitable for use as a container of blood and various medicinal liquids.

6 Claims, No Drawings

MEDICAL BAG

This is a Continuation of application Ser. No. 082,915, filed 8/10/87, which is a Continuation of application Ser. No. 535,117, filed 9/23/83, both now abandoned.

BACKGROUND OF THE INVENTION

1. Field of the Invention

The present invention relates to a medical bag having excellent sanitariness, flexibility, transparency, and heat-resistance and suitable for use as a container of blood and various medicinal liquids.

2. Description of the Prior Art

Rigid containers made of, for example, glass, polyethylene, and polypropylene, and flexible (or non-rigid) bags made of, for example, poly(vinyl chloride) containing plasticizers have heretofore been known as medical containers or bags. However, the rigid containers have disadvantages in that air should be introduced into the containers by using a transfusion set provided with a vent needle or hole when the liquid contained therein is dropwise introduced into a human body through, for example, a vein and, therefore, the liquid contained therein is likely to be contaminated and air is liable to enter into the vein to cause air embolus. Thus, these rigid containers are not completely satisfied with the needs required from the sanitariness and dangerous viewpoints. On the other hand, flexible bags have advantages in that no air introduction is required, the bag itself is naturally compressed under an atmospheric pressure with the dropwise introduction of the liquid contained therein, no introduction of air contained in the bag into a human body occurs since the liquid contained therein remains in the bottom of the bags at the completion of transfusion, rapid transfusion can be carried out under pressure, and bags are not bulky unlike containers and, therefore, the transportation thereof is easy. For these reasons, the use of the flexible bags as medical containers or bags has increased. However, the use of these flexible bags, especially those made of non-rigid poly(vinyl chloride), involves possible problems caused by migration of the plasticizers into the liquid contained in the bags and toxicity of vinyl chloride monomer contained in poly(vinyl chloride).

SUMMARY OF THE INVENTION

Accordingly, the object of the present invention is to eliminate the above-mentioned disadvantages and problems of the prior art and to provide a medical bag having excellent sanitariness, flexibility, transparency, and heat-resistance against a sterilization treatment temperature.

Other objects and advantages of the present invention will be apparent from the following description;

In accordance with the present invention, there is provided a medical bag composed of a laminate comprising (i) an inner low-density polyethylene layer, (ii) an intermediate layer of ethylene-vinyl acetate copolymer, ethylene-propylene type elastomer, or ethylene-butene-1 type elastomer, and (iii) an outer low-density polyethylene layer.

DESCRIPTION OF THE PREFERRED EMBODIMENT

The low-density polyethylenes usable as the inner and outer layers of the medical bag according to the present invention are those having a density of 0.930 g/cm$^3$ or less. A low-density polyethylene having a density of 0.930 g/cm$^3$ or less has much more excellent sanitariness over poly(vinyl chloride) and also has good flexibility and transparency. However, the use of a low-density polyethylene having a density of 0.920 g/cm$^3$ or more and having a melt flow rate, according to JIS K 6760, of 0.1 to 10 g/10 min, more desirably 0.4 to 3 g/10 min is desirable from the viewpoint of the sterilization treatment temperature conditions. The low-density polyethylene can be modified, for example, slightly crosslinked by an organic peroxide or electron processing system, or blended with other resins such as medium-density polyethylene or 1,2-polybutadiene, fillers such as magnesium hydroxide or magnesium oxide, and additives such as polyethylene wax, as long as the above-mentioned desirable characteristics are not adversely affected for the practical use.

The ethylene-vinyl acetate copolymers, ethylene-propylene type elastomers, and ethylene-butene-1 elastomers used as an intermediate layer of the medical bag according to the present invention should have especially excellent flexibility as well as excellent transparency and also have good adhesive properties to the low-density polyethylene used in the inner and outer layers of the medical bag according to the present invention. In order to obtain the desired flexibility, the use of an ethylene-vinyl acetate copolymer having a vinyl acetate content of at least 15% by weight, more desirably, 18% to 28% by weight and having a melt flow rate, according to JIS K 6760, of 0.4 to 5 g/10 min an ethylene-propylene type elastomer having a propylene content of 60 mole % or less, desirably 15 mole % to 40 mole % and having a melt flow rate, according to JIS K 6760, of 0.3 to 5 g/10 min, or an ethylene-butene-1 type elastomer having a butene-1 content of 5 mole % or more, desirably 8 mole % to 20 mole % and having a melt flow rate, according to JIS K 6760, of 0.3 to 5 g/10 min. These ethylene-vinyl acetate copolymers, ethylene-propylene type elastomers, and ethylene-butene-1 type elastomers can be modified, for example, slightly cross-linked by radiation, or can be blended with other resins such as low density polyethylene, 1,2-polybutadiene, fillers such as magnesium hydroxide or magnesium oxide, and additives such as polyethylene wax, as long as the above-mentioned desirable characteristics are not adversely affected for the practical use. The ethylene-vinyl acetate copolymer, ethylene-propylene type elastomer, and ethylene-butene-1 elastomer are generally used alone as the intermediate layer. However, a mixture of (a) the ethylene-vinyl acetate and (b) the ethylene-propylene type elastomer or the ethylene-butene-1 elastomer in any ratio can optionally be used as the intermediate layer.

The thickness of the laminate is desirably 0.15 to 0.6 mm. A thickness of less than 0.15 mm tends to give the bag an insubstantial feeling, whereas a thickness of more than 0.6 mm tends to result in insufficient flexibility. Although there is no specific limitation on the thickness of each layer, it is desirable that the thickness of the intermediate layer is 60% or more, more desirably 70% to 90%, of the total thickness of the laminate so as to afford the sufficient flexibility to the laminate. Furthermore, the thickness of the inner or outer layer of 0.1 mm or more tends to result in insufficient flexibility, whereas a thickness of the inner or outer layer of less than 0.01 mm tends to cause the decrease in the heat-sealing strength.

The desirable flexibility of the laminate can be represented by a modulus of 600 kg/cm² or less, desirably 500 kg/cm² or less measured by a tapered stiffness meter according to ASTM D 747.

The laminate according to the present invention can be prepared by any conventional lamination method, such as a water-cooling or air cooling type co-extrusion inflation method, a co-extrusion T-die method, a dry lamination method, or an extrusion lamination method. The use of the water-cooling type co-extrusion inflation method and co-extrusion T-die method is desirable from an economical point of view. The laminate is generally prepared in the form of a tube or sheet and, then, is heat-sealed to form a bag having an appropriate shape and desired dimensions. Then, attachments for a liquid inlet and outlet are attached to the bag.

The inside and outside surfaces of the medical bag thus obtained are washed or cleaned with distilled water or disinfectant water having a predetermined temperature prior to the filling of the liquid to be contained in the bag, if necessary, and, then, the liquid is filled in the bag after drying. Then, the medical bag containing the liquid is subjected to a sterilization treatment by, for example, a high pressure steam method. Typical conditions of the high pressure steam sterilization are, for example, 115° C.×30 min and 121° C.×20 min.

When the medical bag according to the present invention is subjected to the high pressure steam sterilization, it has been found that wrinkles are likely to be generated near or around the sealed portions of the bag, whereby the external appearance of the bag is somewhat impaired. The generation of the wrinkle can, however, be advantageously prevented by fixing the medical bag in place during the sterilization treatment. The fixing of the medical bag can be done by, for example, mechanically fixing the top and bottom edges and/or the left and right edges of the sealed portions of the medical bag, stacking the medical bags, or pressurizing the center portion of the medical bag by any object or body.

Furthermore, it has been found that the transparency of the medical bag is improved when the bag is subjected to a heat treatment at a temperature of 40° C. or more for at least 10 minutes. A heat treatment temperature of less than 40° C. requires too long a heat treatment time, whereas a heat treatment time of less than 10 minutes does not result in the substantial improvement in the transparency.

Each layer of the medical bag according to the present invention is transparent. The desired sanitariness, heat-resistance suitable for the sterilization treatment, and heat-sealability can be obtained by the inner and outer layers of the medical bag according to the present invention, and the desired flexibility and the adhesive properties with the inner and outer layers can be obtained by the presence of the intermediate layer. Thus, the medical bag according to the present invention has the advantages that the undesirable migration of the plasticizers of poly(vinyl chloride) and the possible toxicity of the vinyl chloride monomer can be completely prevented, while the characteristics of the conventional flexible (or non-rigid) medical bag are retained.

EXAMPLE

The present invention will now be further illustrated by, but is by no means limited to, the following Examples.

Examples 1 to 6 and Comparative Examples 1 to 4

Laminated sheets having the composition of the synthetic resins and the layers listed in Table 1 were prepared by using a water-cooling co-extrusion inflation method in Examples 1 to 6 and Comparative Examples 1 and 2 and by using a T-die method in Comparative Examples 3 and 4. From the laminated sheets thus obtained, medical bags having internal volumes of 500 cc were formed.

The various properties and characteristics of these medical bags were determined. The results are shown in Table 1 below. The abbreviations used in the Table 1 are as follows:

LDPE: Low-density polyethylene having a density of 0.927 g/cm³ and a melt flow rate of 1.1 g/10 min at 190° C.;

EVA: Ethylene-vinyl acetate copolymer having a vinyl acetate content of 25% by weight and a melt flow rate of 2.0 g/10 min at 190° C.;

EPR: Ethylene-propylene type elastomer having a density of 0.900 g/cm³, a melt flow rate of 1.2 g/10 min at 190° C., and a propylene content of 28 mole %;

EB: Ethylene-butene-1 type elastomer having a density of 0.890 g/cm³, a melt flow rate of 3.5 g/10 min at 190° C., and a butene-1 content of 10 mole %;

HDPE: High-density polyethylene having a density of 0.948 g/cm³ and a melt flow rate of 1 g/10 min; and PP: Propylene random copolymer having an ethylene content of 4% by weight and a melt flow rate of 1 g/10 min at 230° C.

The fixing is carried out by stacking three bags containing the liquid contents.

The properties and the characteristics of the bags were determined as follows:

Heat-resistance: The conditions (e.g., deformation, breaking, leakage) were visually observed after the bag containing the liquid content (i.e., physiological saline solution) was subjected to a high pressure steam sterilization treatment at a temperature of 115° C. for 30 minutes, followed by treating at a temperature of 40° C. for 10 minutes;

Modulus in flexibility: determined by using a taper stiffness meter according to ASTM-D-747;

Natural dischargeability: Visually observed;

Transparency: The bag was filled with physiological saline solution and the contamination of the content with foreign substances (e.g., glass and plastic particles) was visually observed after the high pressure steam sterilization treatment.

The transmittance was measured at 450 mμ in the visible absorption spectrum area;

Sanitariness: determined by a test method for a plastic container for transfusion according to Japanese Pharmacopoeia; and Visual appearance: The conditions of wrinkles, deformation and breaking were visually observed The visual observation results are evaluated as follows:

⬤ Very good
○ Good
Δ Fair
x Poor

TABLE 1

| | Outer layer (μ) | Thickness Intermediate layer (μ) | Inner layer (μ) | Total thickness (μ) | Presence of fixing*1 | Heat resistance 115° C. × 30 min | Flexibility Modulus kg/cm² | Flexibility Natural dischargeability | Transparency Visual observation | Transparency Transmittance | Sanitability test | Visual appearance | Overall evaluation |
|---|---|---|---|---|---|---|---|---|---|---|---|---|---|
| Example 1 | LDPE (40) | EVA (220) | LDPE (40) | 300 | Yes | ○ | 350 | ◉ | ○ | 85 | Pass | ○ | ○ |
| Example 2 | LDPE (40) | EPR (220) | LDPE (40) | 300 | Yes | ○ | 340 | ◉ | ○ | 88 | " | ○ | ○ |
| Example 3 | LDPE (40) | EB (220) | LDPE (40) | 300 | Yes | ○ | 360 | ◉ | ○ | 86 | " | ○ | ○ |
| Example 4 | LDPE (40) | EVA (220) | LDPE (40) | 300 | No | ○ | 350 | ◉ | Δ | 82 | " | Δ | ○ |
| Example 5 | LDPE (60) | EVA (210) | LDPE (30) | 300 | Yes | ○ | 410 | ◉ | Δ | 80 | " | Δ | ○ |
| Example 6 | LDPE (40) | EVA (320) | LDPE (40) | 400 | Yes | ○ | 355 | ○ | | 83 | " | ○ | ○ |
| Comparative Example 1 | HDPE (40) | EPR (220) | LDPE (40) | 300 | Yes | ◉ | 620 | Δ | Δ | 65 | " | ○ | Δ |
| Comparative Example 2 | PP (40) | EVA (220) | LDPE (40) | 300 | Yes | ◉ | 610 | Δ | ○ | 75 | " | ○ | Δ |
| Comparative Example 3 | — | EVA (300) | — | 300 | Yes | x | 320 | ○ | ◉ | 70 | " | x | x |
| Comparative Example 4 | — | EPR (300) | — | 300 | Yes | x | 270 | ○ | ◉ | 70 | " | x | x |

We claim:

1. A medical bag composed of a laminate having a total thickness of 0.15 to 0.6 mm comprising:
   (i) an inner low-density polyethylene layer,
   (ii) an intermediate layer having a thickness of 60% to 90% of the total thickness and composed of
      (a) a non-hydrolyzed ethylene-vinyl acetate copolymer having a vinyl acetate content of 15% to 28% by weight;
      (b) an ethylene-propylene type elastomer having a propylene content of 15 to 40 mole %, or
      (c) an ethylene-butene-1 type elastomer having a butene-1 content of 8 to 20 mole %, and
   (iii) an outer low-density polyethylene layer.

2. A medical bag as claimed in claim 1, wherein the inner and outer layers are composed of low-density polyethylene having a density of 0.920 to 0.390 g/cm³.

3. A medical bag as claimed in claim 1, wherein the ethylene-propylene type elastomer has a density of about 0.900 g/cm³.

4. A medical bag as claimed in claim 1, wherein the ethylene-butene-1 type elastomer has a density of about 0.890 g/cm³.

5. The medical bag as claimed in claim 1, wherein said laminate has a modulus of 600 kg/cm² or less as measured by a tapered stiffness meter according to the ASTM D 747 method.

6. The method bag as claimed in claim 5, wherein said laminate has a modulus of 500 kg/cm² or less as measured by a tapered stiffness meter according to the ASTM D 747 method.